US006956832B1

(12) United States Patent
Muhonen et al.

(10) Patent No.: US 6,956,832 B1
(45) Date of Patent: Oct. 18, 2005

(54) METHOD FOR DELIVERING MESSAGES IN A WIRELESS COMMUNICATIONS SYSTEM USING THE SAME PROTOCOL FOR ALL TYPES OF MESSAGES

(75) Inventors: Ahti Muhonen, Hirvihaara (FI); Michael Rooke, Hyvinkää (FI); Serge Haumont, Helsinki (FI); Lassi Hippeläinen, Helsinki (FI); Kari Kurronen, Irving, TX (US); Mikko Puuskari, Helsinki (FI); Mikko Heino, Turku (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/719,589

(22) PCT Filed: Jun. 14, 1999

(86) PCT No.: PCT/FI99/00518

§ 371 (c)(1),
(2), (4) Date: Dec. 14, 2000

(87) PCT Pub. No.: WO99/66746

PCT Pub. Date: Dec. 23, 1999

(30) Foreign Application Priority Data

Jun. 15, 1998 (FI) ........................... 981387

(51) Int. Cl.[7] .............................................. H04B 7/00
(52) U.S. Cl. ................................... 370/310; 709/206
(58) Field of Search ......................... 370/310, 465, 370/466, 401, 419, 420, 463, 231, 235, 237; 455/412.1; 709/206

(56) References Cited

U.S. PATENT DOCUMENTS

| 5,333,266 | A | | 7/1994 | Boaz et al. |
| 5,446,678 | A | | 8/1995 | Saltzstein et al. |
| 5,497,373 | A | * | 3/1996 | Hulen et al. ................. 370/259 |
| 5,987,100 | A | * | 11/1999 | Fortman et al. .......... 379/88.14 |
| 6,208,651 | B1 | * | 3/2001 | Van Renesse et al. ...... 370/392 |
| 6,233,318 | B1 | * | 5/2001 | Picard et al. ............. 379/88.17 |
| 6,249,681 | B1 | * | 6/2001 | Virtanen ..................... 455/466 |
| 6,321,257 | B1 | | 11/2001 | Kotola et al. |
| 6,333,973 | B1 | * | 12/2001 | Smith et al. ............. 379/88.12 |
| 6,396,839 | B1 | * | 5/2002 | Ardalan et al. ............. 370/401 |
| 6,421,707 | B1 | * | 7/2002 | Miller et al. ................. 709/206 |
| 6,574,216 | B1 | * | 6/2003 | Farris et al. ................. 370/352 |

FOREIGN PATENT DOCUMENTS

| EP | 0 565 850 | 10/1993 |
| EP | 0 662 763 | 7/1995 |
| WO | WO 87/07801 | 12/1987 |
| WO | WO 95/26088 | 9/1995 |

(Continued)

Primary Examiner—Frank Duong
Assistant Examiner—Michael J Moore
(74) Attorney, Agent, or Firm—Pillsbury Winthrop Shaw Pittman LLP

(57) ABSTRACT

A method and a wireless telecommunications system, a message service center and a mobile station implementing the method for transmitting messages between a mobile station and a second party. The method of the invention includes delivering messages irrespective of the presentation thereof: delivering messages through the same message service center irrespective of the content type and employing the same protocol between the terminal and the message service center for all messages. The content type indicates the presentation of the message contents which may include test, speech, images, video images or various combinations thereof.

20 Claims, 4 Drawing Sheets

FOREIGN PATENT DOCUMENTS

| WO | WO 96/19068 | 6/1996 |
| WO | WO 98/19438 | 5/1998 |
| WO | WO 98/48549 | 10/1998 |
| WO | WO 98/48560 | 10/1998 |

* cited by examiner

METHOD FOR DELIVERING MESSAGES IN A WIRELESS COMMUNICATIONS SYSTEM USING THE SAME PROTOCOL FOR ALL TYPES OF MESSAGES

This application is the national phase of international application PCT/FI99/00518 filed Jun. 14, 1999 which designated the U.S., and that international application was published under PCT Article 21(2) in English.

BACKGROUND OF THE INVENTION

The invention relates to a messaging service in a wireless telecommunications system enabling the transmission of various message types, such as text, images, speech, video images or other data or combinations thereof from a sender to a recipient using the same transmission mechanism, and more particularly to a messaging service in a mobile communications system.

Mobile communications systems have been developed since a need has arisen for people to freely move away from fixed terminals without making it more difficult to reach them. Services offered through mobile stations have improved with the mobile communications systems. Various new forms of services are currently being created for what are known as the third generation mobile communications systems, such as the Universal Mobile Telecommunications System (UMTS) and IMT-2000 (International Mobile Telecommunications 2000), and for current mobile communications systems, such as the Pan-European mobile communications system GSM (Global System for Mobile communications), including the General Packet Radio Service (GPRS) currently being standardized in the GSM phase 2+ in ETSI (European Telecommunications Standard Institute).

The GPRS service is used for providing packet data transmission between mobile data terminals and external data networks, since the GSM network functions as an access network. One of the conditions set for the GPRS service is that it must operate together with various external data networks, such as the Internet or X.25 networks. The GPRS service and the GSM network should therefore be able to serve all users, irrespective of the type of data networks they wish to be connected to through the GSM network. This means that the GSM network and GPRS service must support and process different network addressing methods and data packet formats. The data packet processing also comprises routing of packets in a packet radio network. In addition, the users should be able to roam from their home GPRS network to a visited GPRS network, whose operator backbone network may support a different protocol (for example CLNP) than the home network (for example X.25).

Known messaging services include short message services and voice mail services. Text messages can be sent as short messages. Voice mail services are in general answering services transmitting voice messages. However, a drawback is that neither of said services enable the transmission of images or video images, not to mention the transmission of messages including multimedia. Another problem is that a text message is sent to a different service centre than a voice message. Still another problem is that the size, or the duration, of at least a voice message is limited.

BRIEF DESCRIPTION OF THE INVENTION

It is an object of the invention to provide a method and an apparatus implementing the method so as to solve the above problems. The objects of the invention are achieved with the method, system, service centre and mobile station, characterized by what is disclosed in the independent claims. The preferred embodiments of the invention are the subject of the dependent claims.

The invention is based on the idea to concentrate the transmission of messaging services into one logical service centre in such a manner that a message can be sent from a sender to a recipient through the service centre irrespective of the contents or size of the message. The message may contain text, images, speech, video images, other data or combinations thereof. From hereafter such a message will be referred to as a multimedia message. Here the term multimedia message refers to the content type of the message, meaning that the contents of the message can be represented in a number of ways. The contents may include only text, only speech, text and images, video images and speech, video images including speech and text.

The invention provides the advantage that different types of messages can be delivered to the recipient through one service centre. Another advantage of the invention is that messages including images, video images and multimedia can be sent to a mobile station. A further advantage of the invention is that the size of the multimedia messages does not have to be restricted in any way.

In a preferred embodiment of the invention only a message fulfilling certain conditions is sent directly to the terminal, i.e. to the recipient. This embodiment provides the advantage that the recipient can decide when he/she wants to receive a multimedia message. This is a particularly useful property especially when large multimedia messages are concerned.

In another preferred embodiment of the invention the user of the mobile station can update the conditions of a direct delivery. This embodiment also provides the advantage that the recipient can decide what kind of messages he/she wants to receive as direct deliveries.

In a further preferred embodiment of the invention the properties of the terminal are employed in the direct delivery conditions. This embodiment provides the advantage that such messages are not delivered to the recipient that he/she cannot open with a terminal in use.

In another preferred embodiment of the invention the multimedia message service centre changes the message contents into a mode supported by the terminal. This embodiment also provides the advantage that the sender does not have to know, for example, what kind of image coding the recipient terminal supports. Furthermore, the recipient receives messages that his/her terminal supports.

In a further preferred embodiment of the invention the multimedia message service centre packs the message contents. This embodiment has the advantage that the amount of data to be transferred can be minimized, thus saving network resources.

In a still further preferred embodiment of the invention the multimedia message service centre selects a delivery route for the message based on certain conditions. This embodiment also provides the advantage that the message is transferred by employing the best possible route taking the contents into account.

BRIEF DESCRIPTION OF THE DRAWINGS

In the following the invention will be described in greater detail in connection with the preferred embodiments with reference to the accompanying drawings; in which.

DETAILED DESCRIPTION OF THE INVENTION

In the following the preferred embodiments of the invention will be described by means of GPRS packet radio networks without restricting the invention to such a particular packet radio system. The invention can be applied to all wireless data transmission networks that support at least two different message types. In particular, the invention can be applied to what are known as the third generation mobile communications systems UMTS and IMT-2000 supporting, for example, the transmission of video images. It should be noted that a packet radio network offers only a physical connection between a multimedia message service centre and a service recipient, and the exact functionality and structure thereof are not significant for the invention. The definitions concerning mobile communications systems in general and the GPRS service in particular improve rapidly. Placing different functionalities into network elements may vary, which is why all words and expressions should be interpreted broadly, as they are intended to describe not to restrict the invention.

Figure 1:
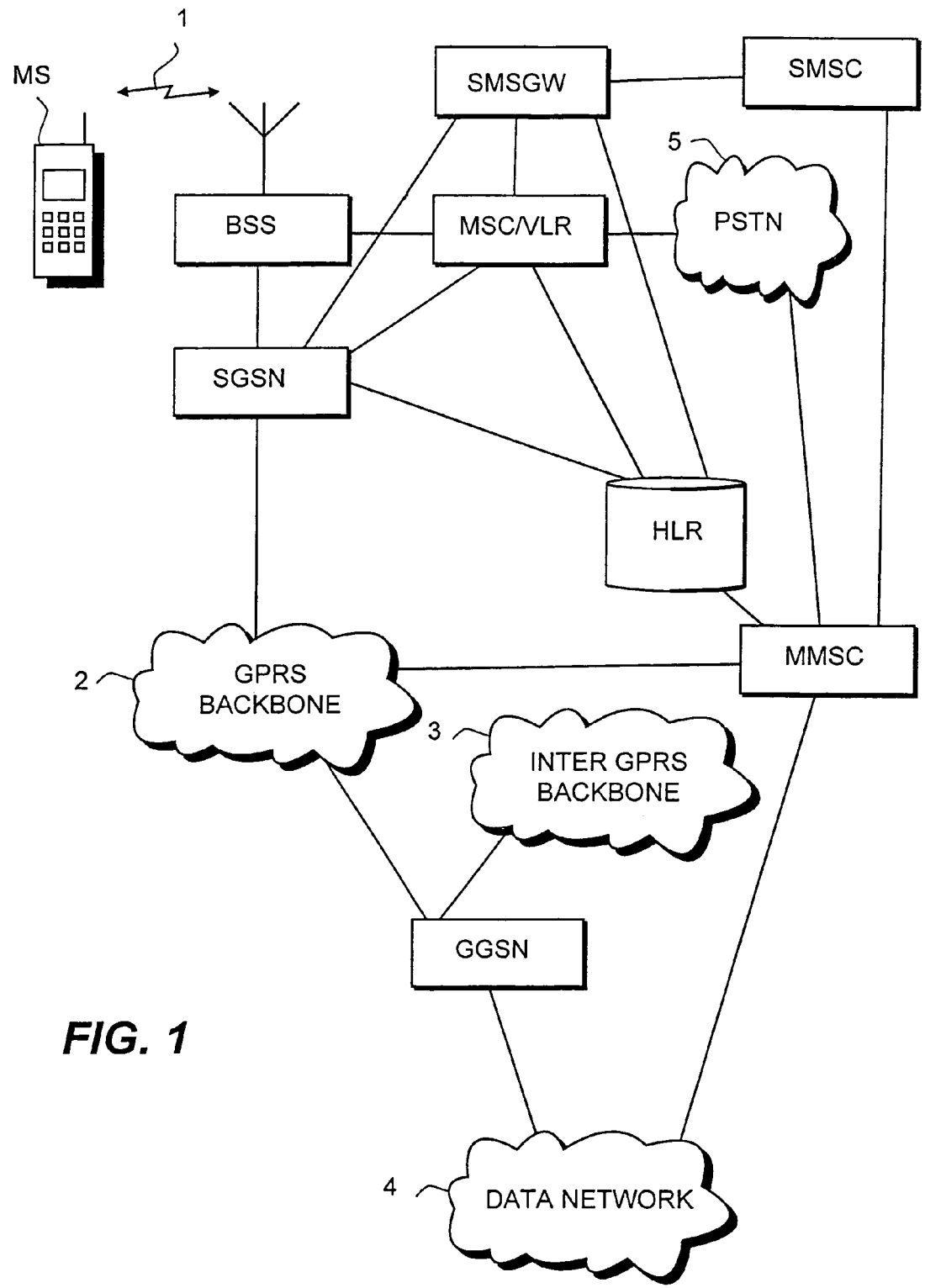
FIG. 1 illustrates a telecommunications system of a first preferred embodiment.

FIG. 1 illustrates a GPRS packet radio service implemented in the GSM system, where the GSM network offers circuit-switched data transmission, whereas the GPRS service offers packet-switched data transmission. As for the invention, FIG. 1 shows the most important elements and functions.

The basic structure of the GSM network comprises two parts, a base station subsystem (BSS) and a network subsystem (NSS). The base station subsystem BSS and mobile stations MS communicate through radio connections 1. The network subsystem comprises at least one mobile switching centre MSC, at least one visitor location register VLR and a home location register HLR. The function of the mobile switching centre is to switch calls including at least one mobile station MS. Some mobile switching centres MSC are connected to other telecommunications networks, such as a public switched telephone network 5 (PSTN), including transmission functionalities for switching calls to and from these networks. The visitor location register VLR is generally connected to a mobile switching centre MSC but it may also serve several centres. When a mobile station MS is active in the GSM network (it has registered into the network and can start or receive a call) most of the subscriber data concerning the mobile station MS in the home location register HLR is loaded (copied) into the visitor location register VLR of the mobile switching centre MSC, in which area the mobile station MS is. For a more detailed description of the GSM system reference is made to the ETSI/GSM recommendations and to the book "The GSM System for Mobile communications", M. Mouly and M. Pautet, Palaiseau, France, 1992, ISBN:2-9507190-07-7.

In FIG. 1 the GPRS service connected to the GSM network comprises one GPRS network having one serving GPRS support node SGSN and one GPRS gateway support node GGSN. These different support nodes SGSN and GGSN are interconnected by an intra-operator backbone network 2 (GPRS Backbone). It should be understood that the GPRS network may comprise any number of support nodes and gateway support nodes.

The serving GPRS support node SGSN is a node serving a mobile station MS. Each support node SGSN manages the packet data service in the area of one or more cells in a cellular packet radio network. For this purpose, each support node SGSN is connected to a particular local part of the GSM mobile communications system. This connection is typically made to the base station subsystem BSS, and generally to a base station controller in the BSS. The mobile station MS in a cell communicates with a base station across a radio interface 1 and further through the base station controller with the support node SGSN to whose service area the cell belongs. In principle, the mobile communications network between the support node SGSN and the mobile station MS only transmits packets between the two. For this purpose, the mobile communications network offers transmission of packet-switched data packets between the mobile station MS and the serving support node SGSN.

The GPRS gateway support node GGSN connects the GPRS network of the operator with other GPRS services of the operators and with data networks 5, such as the IP network (Internet, Intranet) or X.25 network. The GGSN comprises routing information of GPRS subscribers, or the SGSN addresses. The SGSN and GGSN functions can be connected to the same physical node.

The home location register HLR of the GSM network includes the GPRS subscriber data, the telephone number MSISDN (Mobile Subscriber international ISDN number) of the mobile station subscriber and the routing information connecting the international mobile subscriber identity IMSI of the subscriber with said data. The GPRS subscriber data includes PDP-contexts and default GGSNs and addresses thereof, for example as IP addresses. In addition, the home location register HLR of the invention can maintain an address list for each subscriber in its registers, the address list comprising the address of the multimedia message service centre where a multimedia message is waiting for delivery to the mobile station. The list is maintained in the same way as the address list of short message service centres SMSC. Furthermore, the HLR can alert the multimedia message service centre MMSC in the same way as the short message service centre, when the subscriber registers into the network. Hence, the HLR "considers" the multimedia message service centre MMSC as merely a new network element and is able to perform the functions required by the invention by employing current routines. Only additional memory is needed. The home location register HLR of a roaming mobile station MS can be placed in another mobile communications network than the serving SGSN.

An intra-operator backbone network 2 interconnecting the operator equipment SGSN and GGSN can be implemented, for example, by a local network, such as the IP network. It should be noted that it is also possible to implement the operator GPRS network without the intra-operator network, for example by implementing all the features in one computer.

An inter-operator GPRS backbone network 3 is a data network through which the gateway support nodes GGSN of different operators can communicate with one another.

Here a mobile station MS generally refers to an entity composed of a mobile station subscriber and an actual terminal. The terminal can be any terminal that is able to communicate in a mobile communications system or a combination of several terminals, like a multimedia computer, to which, for example, a card phone manufactured by Nokia is connected in order to establish a mobile-like connection. The subscriber is identified from a subscriber identification module SIM detachably connected to the terminal. As the identification module is detachable, the subscriber may change terminals and use a terminal that is best suitable for each purpose. The mobile station of the invention is described in greater detail below in FIG. 8.

For short message service the system comprises a short message service centre SMSC and a short message service gateway SMSGW. The short message service gateway SMSGW transmits short messages to and from a mobile station.

The system of the invention comprises a multimedia message service centre MMSC for multimedia message service MMS. The multimedia message service centre MMSC is not necessarily one entity but can be composed of functionalities decentralized into different units. Hereafter the multimedia message service centre MMSC will, however, for clarity be treated as one entity. The MMSC forwards multimedia messages and stores and resends multimedia messages, which have not been delivered. The multimedia message service centre MMSC can preferably receive a multimedia message to be delivered to a mobile station through any network. The operator can, if he/she desires, restrict such delivering networks to certain network types only, for example to public and private IP networks. The operation, structure and interfaces of a multimedia message service centre will be explained below in FIG. 7. FIG. 1 shows a first preferred embodiment of the invention, where the multimedia message service centre MMSC is directly connected to the intra-operator backbone network 2, in which case it functions also as a GPRS gateway support node. In the first preferred embodiment the multimedia message service centre communicates with the home location register HLR and the short message service centre SMSC, a data network 4 and the public switched telephone network 5. These connections are either direct signalling connections or signalling connections implemented through an internal network.

In a mobile communications network the home and visitor location registers are used substantially in the same way for routing multimedia messages as for routing calls or short messages. In the first preferred embodiment the multimedia message route is generally the following: multimedia message service centre MMSC—intra-operator backbone network 2—serving support node SGSN—base station subsystem BSS—mobile station MS. A GPRS air interface is then used as a radio interface. Air interfaces, such as W-CDMA, defined in the third generation systems can also be used as the radio interface. The advantage of this embodiment is the rapid delivery of the multimedia message. Another advantage is that the solution does not load the circuit-switched network part.

The solution according to the first preferred embodiment can also support the loading of the multimedia message to the mobile station using circuit switching, in which case the delivery route is, for example, the following: multimedia message service centre MMSC—public switched telephone network 5—mobile services centre MSCNLR—base station subsystem BSS mobile station MS. The GSM air interface or air interfaces defined in the third generation systems, such as EDGE, are then used as the radio interface.

In a second preferred embodiment (not shown in the Figure) the multimedia message service centre is connected to the short message service gateway SMSGW. The multimedia message service centre communicates with the data networks 4 and possibly with the public switched telephone network 5. In the second preferred embodiment the multimedia message route is in general the following: multimedia message service centre MMSC—short message service gateway SMSGW—serving support node SGSN—base station subsystem BSS—mobile station MS. An advantage with this solution is that message transmission can utilize the current concatenation of short messages and no major changes need to be made to the system. Another advantage with the solution is that multimedia messages can be delivered as normal short messages through a mobile switching centre MSC, if no GPRS connection is available. However, the transmission of messages is then considerably slower than when using a GPRS connection. In the solutions according to the second preferred embodiment the multimedia message service centre MMSC can be integrated to a short message service centre SMSC.

In a third preferred embodiment (not shown in the Figure) the multimedia message service centre MMSC is connected to a gateway support node GGSN through the intra-operator backbone network 2 or the inter-operator backbone network 3. The multimedia message service centre communicates with the data networks 4 and possibly with the public switched telephone network 5. In the third preferred embodiment the multimedia message route is in general the following: multimedia message service centre MMSC GPRS gateway support node GGSN—serving support node SGSN—base station subsystem BSS—mobile station MS. The solution provides the advantages that a multimedia message can be delivered rapidly, the circuit-switched network is not loaded, multimedia messages can also be delivered to fixed IP addresses and the multimedia message service centre does not necessarily need an SS7 protocol stack. In addition, the network does not require new interfaces.

A multimedia message entity MME can be any means enabling messages to be sent and/or received. The most simple MME can transmit only, for example, speech or text, whereas a complex MME can transmit video images including text and speech. The MME can be a mobile station, an entity connected directly to the multimedia message service centre or an application sending a multimedia message through the data network 4. The sending multimedia message entity and the users thereof must be identifiable as accurately as the billing requires in the embodiments in which the sender pays for the transmission of the message.

When the mobile station MS makes attach to the GPRS network, i.e. in connection with a GPRS Attach procedure, the SGSN forms a mobility management context (MM-context) comprising information associated with, for example, the mobility and safety of a mobile station MS. Correspondingly, in connection with a PDP activating procedure the SGSN forms a PDP-context which is used for routing purposes within the GPRS network with the GGSN that the GPRS subscriber employs. Since the multimedia message service centre MMSC operates in the first and second preferred embodiments as the gateway support node GGSN for the multimedia messages, a context can correspondingly be activated between the mobile station and the multimedia message service centre, what can be called a multimedia message service context (MMS-context). When said context is activated the mobile station can receive and send multimedia messages. An alternative for activating the MMS-context is that the MMSC sends a multimedia message without separately activating the context. Then the MMSC requests for routing instructions from the home location register HLR and upon reception thereof sends a particular message (MMS Datagram) to the SGSN, which finds a user within the area on the basis of the MSISDN number or the IMSI and sends said message over the radio interface to the mobile station MS. The mobile station MS acknowledges the message by sending a reply message (MMS Datagram Acknowledge). This alternative solution requires that the MMSC, SGSN and MS are constantly ready to receive multimedia messages, even if a particular context is not activated. In addition, new datagrams (messages resembling the signalling messages) have to be defined into GTP (GPRS Tunneling Protocol) and SNDCP (Subnetwork Convergence Protocol) protocols. Furthermore, an NSAPI value informing the recipient that a multimedia message is concerned has to be allocated for the transmission of multimedia messages. A tunnel identifier (TID) used in the GTP protocol can be composed of the user IMSI and the NSAPI value allocated to multimedia messages. Based on this information the SGSN knows that a multimedia message is concerned and finds the user even if it does not know the MSISDN number thereof. When the MS wishes to send a multimedia message, it uses corresponding messages in the uplink direction. The MMSC can be identified using an APN or in some other way.

Figure 2:
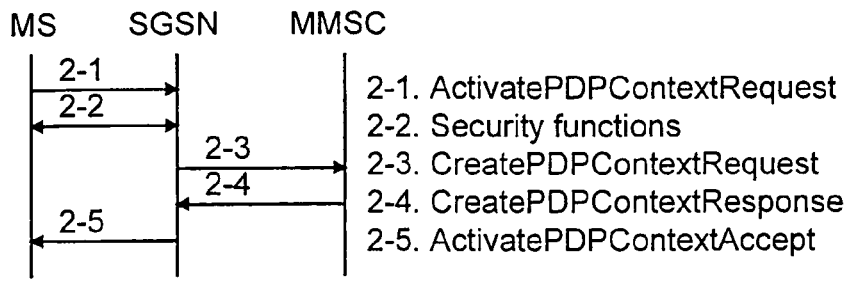
FIG. 2 shows signalling associated with MMS-context activation.

The multimedia message context activation is carried out, for example, using the signalling shown in FIG. 2, where, the mobile station MS sends an activate PDP-context request (ActivatePDPContextRequest) to the serving support node SGSN in message 2-1. The message includes at least an access point name APN allowing to identify the multimedia message service centre and an indication of the desire to activate a multimedia context. Other means than the APN for indicating an address can also be used as the multimedia message service centre address. What is essential is that the multimedia message service centre is identified in some way. In addition, message 2-1 may include information about how much memory the mobile station has available for multimedia messages, what kind of data the mobile station supports (text, images, speech) and the presentation format thereof. Furthermore, the message may include values for some condition parameters. A separate message that can be sent anytime can be employed for adjusting condition parameters. The condition parameters will be described in greater detail below in FIG. 7. After receiving a message the serving support node SGSN and the mobile station MS perform authentication signalling according to prior art in messages 2-2 (Security functions). When the authentication is performed the serving support node SGSN sends a create PDP-context request (CreatePDPContextRequest) to the multimedia message service centre MMSC in message 2-3, to which the service centre replies by sending a create PDP-context response (CreatePDPContextResponse) to the serving support node in message 2-4. The serving support node SGSN transmits an acceptance to the mobile station MS by sending an activate PDP-context acceptance (ActivePDPContextAccept) in message 2-5. After this the context to the multimedia message service centre MMSC is activated from the mobile station, and the mobile station can send and receive multimedia messages through the multimedia message service centre.

The multimedia service context activation shown in FIG. 2 may occur always when the mobile station makes attach to the GPRS network, the signalling in FIG. 2 then being a part of network attachment signalling. Alternatively the user may activate the multimedia service context when desired or activation may occur as a consequence of an activation request received from the GPRS network (GPRS network requested PDP-context activation). The activation request can be generated by, for example, a multimedia message service centre, if it observes that the message has to be delivered to such a mobile station that has not activated the MMS-context. If the mobile station activates the MMS-context always when it makes attach to the network, the multimedia message service centre MMSC is automatically informed about the mobile station being in the network again, and a separate "alarm system" like the one implemented in connection with short message service is not necessarily needed.

In an embodiment where the multimedia message is transferred along a circuit-switched route or through the conventional GSM network, the MMS-context does not necessarily have to be activated.

In a third preferred embodiment of the invention the MMS-context is created through the GGSN node, in which the PDP-context has to be activated in accordance with prior art. Then the MMS-context does not have to be activated.

Figure 3:
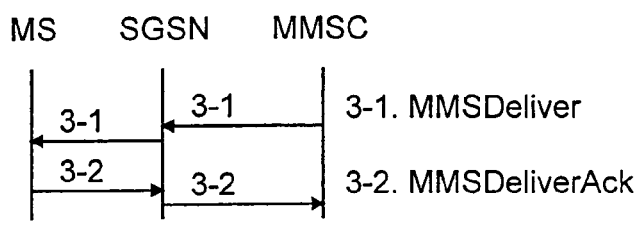
FIGS. 3, 4 and 5 show signalling according to a protocol needed for transferring a multimedia message in a first preferred embodiment.

FIG. 3 shows signalling according to a protocol needed for transferring a multimedia message in the first preferred embodiment. A specific protocol is needed for transferring multimedia messages between the multimedia message service centre and the mobile station. The protocol is overlying the actual transmission protocols. For example, in the mobile station MS the protocol overlies the SNDCP protocol and the GTP protocol in the multimedia message service centre MMSC. It is assumed in the example shown in FIG. 3 that the MMS-context in the receiving mobile station is activated. Since the MMS-context is activated, the multimedia message service centre MMSC comprises up-to-date routing information, because the SGSN informs the MMSC as "other" gateway support nodes GGSN about the movements of the user by sending a PDP-context update request (Update PDP-context Request). It is also assumed that direct delivery conditions are met and the multimedia message is delivered. The conditions are described in greater detail in FIG. 7.

With reference to FIG. 3 a multimedia message has arrived to the multimedia message service centre MMSC. The sender of the message has preferably sent the message directly using an MSISDN telephone number. If the message is sent from another mobile station, then the address of the recipient is only the MSISDN telephone number. If the message is sent by means of an application in, for example, the Internet or Intranet, the address of the recipient can be written, for example, as MSISDN@operator.country or first name.last name@operator.country. However, using the address of the latter example requires that the multimedia message service centre has a connection to a domain name server. The recipient can also be indicated in some other way separately agreed upon. When the multimedia message service centre MMSC has established the location of the mobile station corresponding to the address it sends through the serving support node SGSN to the mobile station MS the contents of the message or if the message is so long that is must be divided into segments the first segment thereof in message 3-1 multimedia message delivery (MMSDeliver). The message is transferred in the first preferred embodiment preferably using the GTP protocol between the MMSC and the SGSN and using the SNDCP protocol between the SGSN and the MS. Message 3-1 multimedia message delivery preferably includes the following elements: a parameter showing that a reply path exists; a message reference; a segment number; whether a last segment is concerned; an address of the message sender; a parameter indicating how the user data or the actual contents of the message are coded; a service centre time stamp indicating the time when the service centre received a message and user data. Message 3-1 may also include the size of the actual multimedia message (particularly if it is divided into several segments). The MS can use this information, for example, when deciding whether it has enough memory available for the message. This is useful particularly in the embodiments where a separate context is not created or where the messages are automatically sent to the user. In addition, the message may comprise a parameter indicating what the user data is. By means of said parameters the mobile station identifies whether it received text, video images, ordinary images, speech or a combination thereof in the message. The user data type can also be concluded from the coding used. The reply path comprises a reply routine used in connection with multimedia messages. By means of the reply path the reply sent by the subscriber is routed to the mobile station that sent the message, through the multimedia message service centre through which the message was originally delivered to the subscriber, instead of the multimedia message service centre stored as a default value in the terminal. Said routine allows the subscriber to reply to the multimedia message without having to know the network address of the multimedia entity or the multimedia message service centre that originally sent the message. The reply does not have to be of the same type, as a text message can be sent as a reply to an image message.

When the mobile station has received message 3-1, it sends an acknowledgement in message 3-2 (MMSDeliver-Ack) which preferably includes the reference and segment number of the received message. Message 3-2 is sent from the mobile station to the serving support node SGSN using the SNDCP protocol and using the GRP protocol between the serving support node and the multimedia message service centre. Message pairs 3-1 and 3-2 are sent until the last segment of the message has been delivered. One acknowledgement message 3-2 can be used to acknowledge one or more messages 3-1. In the embodiment that least loads the network, the mobile station awaits until it has received all segments belonging to the same multimedia message, and acknowledges the entire message with a single acknowledgement. When the entire message is acknowledged, the multimedia message service centre can, for example, form a billing record concerning the sending of the message and acknowledge the delivery of the message from the message sender.

When the mobile station has received the multimedia message, it stores it in the memory and informs the mobile station user about the received multimedia message or triggers a predetermined application. At the same time the mobile station preferably indicates the type and size of the message. If the multimedia message is sent in several segments, the mobile station identifies the symbol of the last segment and is able to compose the message. The user "reads" the message when it suits him/her. The mobile station can also deliver a multimedia message or a message thereof to an external terminal attending to the following measures.

Message 3-2 can also be a negative acknowledgement (MMSDeliverNack), for example, if the mobile station does not have enough memory available. Alternatively the mobile station can send an explicit negative acknowledgement message.

In a second preferred embodiment where multimedia messages are delivered through an ordinary short message service, messages are transferred as short message signalling messages over the radio interface using an LLC protocol.

In the embodiments, where a separate context is not activated at all or where the MMS-context is not always activated when the mobile station can be reached, the MMSC must retrieve routing instructions from the relevant home location register HLR in order to know where to send messages 3-1 and 3-2 in FIG. 3. Furthermore, in the embodiments, where the MMS-context is not always activated when the mobile station can be reached, the multimedia message service centre can, for example, send a context activation request (Network Requested Context Activation) to the mobile station after receiving routing instructions. After the reception of the context activation request the mobile station activates the MMS-context as shown in FIG. 2. Alternatively a short message can be sent to the mobile station to inform about the reception of the multimedia message. The user then decides when he/she wishes to receive the message and initiate the MMS-context activation.

If the multimedia message cannot be delivered to the mobile station because e.g. the radio channel circumstances are poor or the mobile station has logged out from the network, then the process may proceed as a short message service. However, the multimedia message service centre is informed about failure and the message is stored for retransmission. If the embodiment requires an "alarm system", the home location register HLR is informed about a waiting multimedia message. The HLR updates the data needed in the register informing that a multimedia message is waiting for this subscriber in the multimedia message service centre. When the mobile station next makes the GPRS attach the home location register HLR informs the multimedia message service centre about it, which in turn delivers the message as explained above in FIG. 3 assuming that the validity period of the message is still valid. The multimedia message service centre MMSC deletes outdated messages from its memory.

Figure 4:
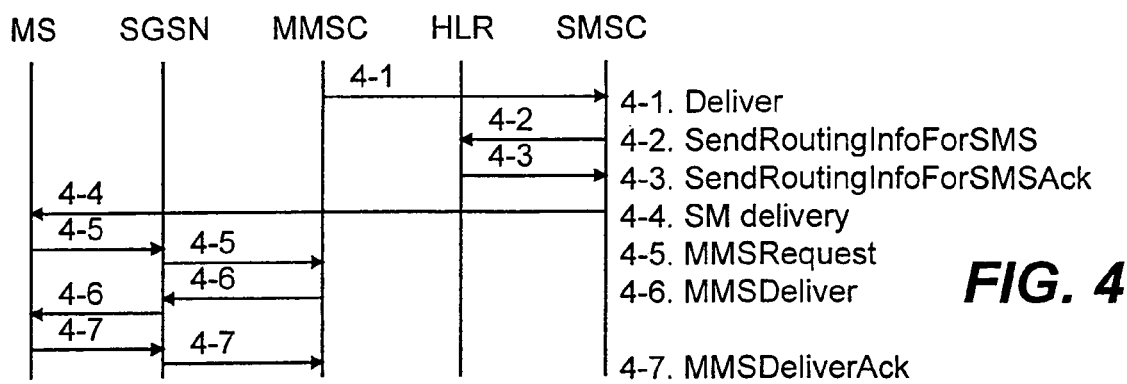

FIG. 4 shows signalling according to a protocol needed for transferring a multimedia message in the first preferred embodiment when one of the direct delivery conditions is not fulfilled. The conditions are explained in greater detail in FIG. 7. The multimedia message is therefore not delivered directly to a mobile station, but a short message can preferably be sent to the mobile station informing about a waiting multimedia message. It is assumed in the example in FIG. 4 that the MMS-context is activated. It is also assumed that the multimedia message can be delivered and that the validity period of the multimedia message is still valid.

With reference to FIG. 4, a multimedia message has arrived to the multimedia message service centre MMSC, and the recipient of the multimedia message must be informed about the reception of the multimedia message, which cannot automatically be forwarded. In the first preferred embodiment the multimedia message service centre issues a command to the short message service centre SMSC to generate and send a short message to the mobile station MS in message 4-1 deliver (Deliver). The message includes the telephone number of the recipient MSISDN, the address APN of the multimedia message service centre MMSC, the multimedia message identifier and preferably the multimedia message size. The message may include other data as well, such as an indication of the content type of the multimedia message. The more information can be added from the multimedia message to the short message, the better the recipient is able to conclude when he/she wants to receive the message. However, it is essential that the data in message 4-1 enables the short message service centre to know to whom it sends the short message and from which multimedia message service centre it has received the command. When the short message service centre SMSC has received message 4-1 it generates the short message, in which the multimedia message service centre is indicated as a sender address and the multimedia message identifier is indicated as a message identifier. Alternatively the MMSC can generate the short message, in which case it is included in message 4-1. When a short message is in the short message service centre SMSC, the SMSC studies the address of the recipient and requests a routing address (Send Routing Info For SMS) from the relevant home location register in message 4-2 on the basis of the subscriber's MSISDN telephone number. The home location register sends normal routing instructions for short messages to the short message service centre in message 4-3 (Send Routing Info For SMS Ack) including either the address of the support node SGSN serving the mobile station or the address of the mobile switching centre MSC serving the mobile station or both. The short message service centre SMSC delivers the short message to the mobile station in message 4-4 (SM delivery) in accordance with prior art through the mobile switching centre MSC or the serving support node SGSN.

When the mobile station user decides to load a multimedia message sent for him/her into the mobile station, he/she issues a command to the mobile station to load the multimedia message. The mobile station sends through the support node SGSN serving the mobile station to the address of the multimedia message service centre in the short message informing about the multimedia message a multimedia service request (MMSRequest) in message 4-5, where the multimedia message identifier in the short message is a parameter. In the first preferred embodiment the message is preferably transferred using the SNDCP protocol between the MS and the SGSN and using the GTP protocol between the SGSN and the MMSC. When the multimedia message service centre MMSC has received message 4-5 it already knows the routing information of the mobile station, since it received the message from the serving support node SGSN. Hence, the multimedia message service centre retrieves from its memory a multimedia message according to the identifier in message 4-5. When the multimedia message service centre MMSC has found the message it sends to the mobile station MS through the serving support node SGSN the contents of the message or if the message is so long that it has to be divided into segments the first segment thereof in message 4-6 multimedia message delivery (MMSDeliver). Message 4-6 corresponds to message 3-1 shown in FIG. 3. When the mobile station has received message 4-6 it sends an acknowledgement (MMSDeliverAck) in message 4-7. Message 4-7 corresponds to message 3-2 shown in FIG. 3. Sending the actual message and acknowledging transmission are similar irrespective of whether the multimedia message was sent directly to the mobile station or whether a short message was sent to inform about the multimedia message. A multimedia message divided into segments is delivered using message pairs 4-6 and 4-7 as explained in FIG. 3. When the message has been delivered, the mobile station informs the user about the received message as shown in FIG. 3.

If a short message is not sent to the user when a multimedia message arrives (for example, an operator does not support the feature, the user does not want a short message to be sent or wants a short message sent only for the first multimedia message waiting) the user may be offered a specific operation (MMS Status Request) for the inquiry of attributes of multimedia messages waiting in the multimedia message service centre MMSC. When the user is informed about waiting multimedia messages and the identifiers thereof (MMS Status Response) he/she may retrieve only the messages he/she desires from the multimedia message service centre.

If the life time, or validity time, of the multimedia message is no longer valid, the multimedia message service centre preferably informs the mobile station that the message can no longer be delivered.

In embodiments, where the MMS-context is not always activated when the mobile station can be reached, the mobile station can, for example, be arranged to trigger the MMS-context activation as a response to the user's command to load the multimedia message as shown in FIG. 2. The multimedia message service centre can also send a multimedia service request after receiving the MMS-context activation request to the mobile station, and after the reception thereof the mobile station activates the MMS-context as shown in FIG. 2.

In some preferred embodiments of the invention an identifier of the multimedia message recipient is also attached to message 4-1. The person who possesses the recipient identifier is the correct recipient of the message. The recipient identifier is preferably a cryptographic identifier, for example a hash, in which the elements may include the sender of the multimedia message (for instance, MSISDN), the recipient (for instance, MSISDN), the contents and a consecutive number. The elements preferably also include the contents of message 4-1 and an MMSC-specific secret value. The created recipient identifier can obtain any value which, however, remains the same when the value is calculated using the same element values. If the value of one element changes, then the hash "unexpectedly" changes in such a manner that a new hash cannot be calculated from the old one. This recipient identifier is transmitted in message 4-4 to the mobile station user, who employs the recipient identifier in message 4-5 to identify the multimedia message to be received and the correct recipient. Other authentications are not needed in these embodiments.

Figure 5:
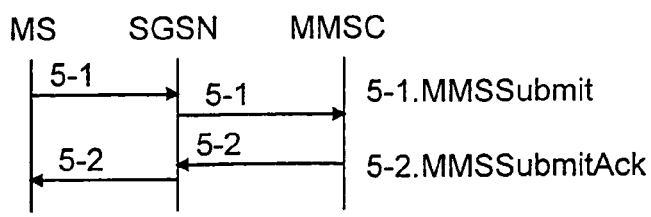

FIG. 5 shows signalling according to a protocol needed for transferring a multimedia message in the first preferred embodiment, when the mobile station wishes to send a multimedia message. The mobile station can, if necessary, divide the message into segments, if the message is so large that it cannot be transferred over the radio interface in one message. The mobile station sends through the serving support node SGSN to the multimedia message service centre MMSC the contents of the message or, if the message is so long that it has to be divided into segments the first segment thereof in message 5-1 multimedia message delivery (MMS Submit). The message is preferably transferred using the SNDCP protocol between the mobile station MS and the serving support node SGSN and using the GTP protocol between the SGSN and the multimedia message service centre MMSC. Message 5-1 the multimedia message delivery preferably comprises the following parts: a parameter indicating that a reply path is requested, a message reference, a segment number, whether a last segment is concerned, a destination address of the message, a parameter indicating how the user data, or the actual contents of the message are coded, a validity period of the message indicting when the message is no longer delivered to the recipient and user data. In addition, message 5-1 may include a parameter indicating what user data is. By means of said parameter the multimedia message service centre identifies whether it has received text, video images, ordinary images, speech or a combination thereof, and can correspondingly inform the recipient. From the coding information the multimedia message service centre may also conclude the same information. If the multimedia message is intended for another mobile station user, the MSISDN telephone number of the recipient is preferably used as the destination address. The IP address according to the Internet technique or the form first name.last name@x.y.z can be used as the destination addresses of other recipients. However, the use of the latter alternative requires that the multimedia message service centre communicates with a domain name server enabling the change of a logical name into an IP address.

When the multimedia message service centre MMSC has received message 5-1, it sends an acknowledgement (MMS Submit Ack) in message 5-2, preferably comprising the reference and segment number of the received message. Message 5-2 is sent using the GTP protocol between the multimedia message service centre and the serving support node and using the SNDCP protocol from the serving support node SGSN to the mobile station MS. Message pairs 5-1 and 5-2 are transmitted until the last segment of the message has been sent. The message pairs can alternatively be replaced with the acknowledgement mechanisms described in FIG. 3. Thereafter the multimedia message service centre can send a message to the recipient as shown in FIG. 3 or 4, for example. Message 5-2 can also be a negative acknowledgement (MMS Submit Nack).

The signalling messages shown above in FIGS. 2, 3, 4 and 5 are only presented by way of an example and may include several separate messages for transmitting the same information. The messages may also comprise other information, and be freely combined. The message names can also change. Depending on the operator and system other network elements, into which different functionalities are spread, can also participate in data transmission and signalling. There is no need for all network elements shown in the Figure to participate in signalling, if the message is, for example, delivered through another route to the mobile station MS.

In a third preferred embodiment the signalling shown above in FIGS. 3, 4 and 5 is performed in such a manner that the SGSN transmits the messages to the gateway support node GGSN preferably using the GTP protocol, which in turn transmits the messages preferably using the IP protocol to the multimedia message service centre MMSC. In the third preferred embodiment the short message service gateway SMSGW is not utilized, but instead of a short message the multimedia message service centre MMSC sends a small information message as a multimedia message or data message to the recipient. Alternatively the MMSC can issue a command to the GPRS gateway support node GGSN to inform about the multimedia message in some other way.

Figure 6:
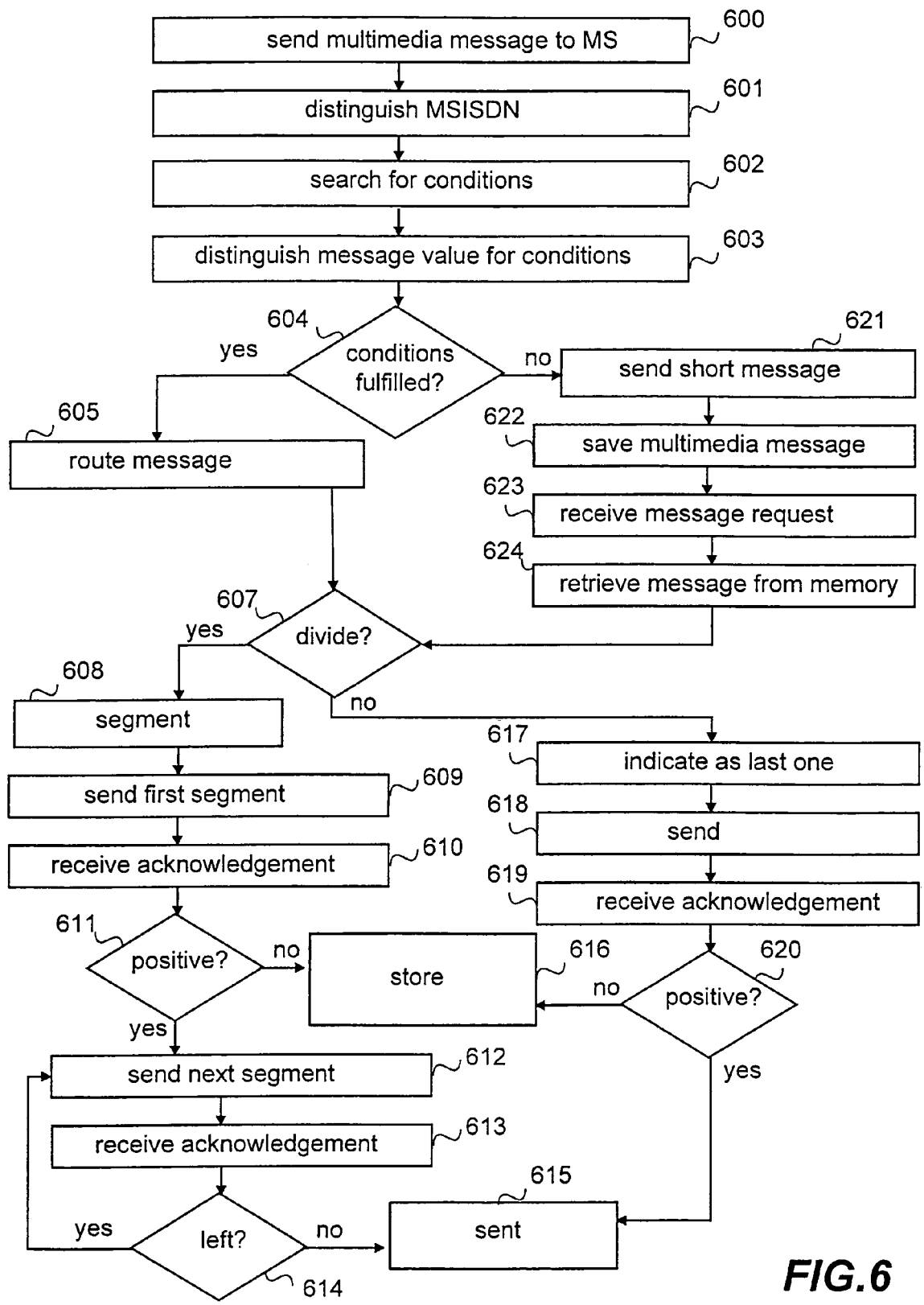
FIG. 6 is a flow chart showing how a multimedia message service centre operates in a first preferred embodiment.

FIG. 6 shows the operation of the multimedia message service centre in the first preferred embodiment, where it is assumed that the MMS-context is activated. It is also assumed that the changing conditions and the conditions set by the operator are determined to the multimedia message service centre. Here the conditions refer to conditions that a multimedia message fulfils and can therefore be sent directly to the recipient. Such conditions may include message size, type of message contents, user interface of the recipient's mobile station, codings supported by the mobile station and content type supported by the mobile station user interface, for example the invention does not restrict the number of conditions. The conditions are also described in FIG. 7. It is also assumed that if the first segment of the message can be delivered, the entire message can be delivered.

FIG. 6 starts from a situation where the multimedia message service centre has received a multimedia message to be sent to the mobile station MS in step 600. In step 601 the MSISDN telephone number of the recipient is distinguished from the message and the conditions associated with the telephone number and the general conditions determined by the operator are searched for in step 602. In step 603 the values according to the conditions, such as the message size and type, are distinguished from the message. In step 604 it is checked whether these values and the conditions determined by the operator and associated with the telephone number are fulfilled. If the conditions are met, the multimedia message can be directly sent to the mobile station, and the message is therefore routed in step 605. The routing has been explained in more detail in FIG. 3. Then, in step 607, it is checked whether the message is so large that it must be divided into segments, i.e. if the message has to be divided. The division must be performed since the SNDCP and GTP protocols of the GPRS network cannot transfer messages exceeding 1500 bytes. If the message has to be divided, it is segmented in step 608. In segmentation the message is divided into segments, which are numbered and the last segment is marked. When the message has been divided, a first segment is sent in step 609 and an acknowledgement is received in step 610. Segments can also be sent gradually as the message is being segmented. If it is noted in step 611 that the acknowledgement is positive, that is the segment has been delivered, the next segment is sent in step 612, and the positive acknowledgement of which is received in step 613. Then, in step 614, it is checked whether any segments remain. If segments are found, the process proceeds to step 612 and sends the next segment. The loop formed of steps 612, 613 and 614 is repeated until all segments are sent. Then, the process proceeds to step 615, where it is noted that the message is sent and an acknowledgement is possibly sent to the sender of the message. In addition, a billing record is formed or the necessary data is sent to the billing centre. This solution provides the advantage that depending on the contract either the sender or the recipient or both can be billed. The problem of prior art voice messages can thus be avoided. The problem is that both parties always have to pay, the sender when sending the message and the recipient when receiving the message.

If it is noted in step 611 that the received acknowledgement is not positive, then the process proceeds to step 616 where the message is stored into the memory for retransmission, if the mobile station makes attach to the network during the validity period of the message. Processing the message in step 616 can also depend on the reason indicated in the negative acknowledgement. For example, if the user does not want to or is not able to receive the message when it is sent, then the message is stored in the memory. Possible reasons why a user does not want to or is not able to receive messages are, for example, the inadequacy of the memory, the message type, the long transmission time of the message or the sender identification data. Such a situation may arise, for example, because the conditions determined in the MMSC are inadequate or because the message is always automatically sent in the embodiment employed. The user can also indicate that he/she does not want to receive the message in the future, in which case the message is deleted from the memory, if it has been stored therein.

If it is noted in step 607 that the message does not have to be divided, the last segment is then indicated as the message segment in step 617, whereafter the message is sent in step 618 and acknowledged in step 619. If it is observed in step 620 that the acknowledgement is positive, i.e. the segment has been delivered, the process proceeds to step 615, where it is noted that the message has been sent and an acknowledgement is possibly sent to the sender of the message. If it is observed in step 620 that the received acknowledgement is not positive, the process proceeds to step 616, where the message is processed as shown above.

If it is observed in step 604 that one of the conditions is not fulfilled, then the message cannot be directly sent to a mobile station. Instead a short message informing the mobile station about a multimedia message is sent in step 621 through the short message service centre SMSC. In step 622 the multimedia message is stored into the memory to wait for delivery. In step 623 a message request is received from the mobile station and the requested message is retrieved from the memory in step 624. Then the process proceeds to step 607 to check if the message must be divided, and thereafter the process proceeds as shown above.

The multimedia messages stored in the memory are deleted from the memory if the validity period thereof is no longer valid or if the multimedia messages are transmitted successfully to the recipient. If the request in step 623 is received when the validity period of the multimedia message has elapsed, then the message can naturally not be found in the memory, and the mobile station is preferably informed that the message cannot be delivered because the validity period thereof is no longer valid.

If the first segment of the message can be delivered but another segment cannot be delivered, then the entire message is stored in the memory for retransmission.

The steps presented above in FIG. 6 are not shown in an absolutely chronological order and a part of the steps can be performed simultaneously or in a deviating order. Other operations can be performed between the steps. Some of the steps can be left out, for example, the acknowledgement of the message is checked only after the segments have been sent. An example of a step that can be left out is step 602 in which conditions are searched for when all messages include the same condition or conditions.

In a preferred embodiment of the invention the multimedia message service centre can change the coding of the multimedia message to a coding that the receiving mobile station supports, or to an otherwise more optimized form of transmission or presentation. For example, a message coded by mpeg-coding can be released in the multimedia message service centre and recoded by jpeg-coding. These measures are preferably performed before the check in step 607. In another preferred embodiment of the invention the multimedia message service centre can pack the messages exceeding a particular limit size, if they are not packed already. This measure is preferably performed before the check in step 607.

The invention does not require restricting the multimedia message size. However, at times the operator or the recipient wishes to restrict the message size. It is then checked in the flow chart shown in FIG. 6, for example after step 602, if the multimedia message is too large. If it is not, the process proceeds as shown in the Figure. If it is, the multimedia message is not delivered to the recipient. Then the sender can be informed that the message cannot be delivered due to the extensive size thereof.

A value of the recipient identifier can be calculated before step 621 and then sent to the mobile station in the embodiments that employ a separate recipient identifier, like a hash. In addition to the multimedia message an identifier can be stored in these embodiments in step 622. Then in step 623 the received message comprises a separate value for the recipient identifier, on the basis of which the correct multimedia message is retrieved in step 624.

It is assumed in FIGS. 2–6 above that a multimedia message is always sent as packet-data. In some embodiments it may also be sent as circuit-switched data through the mobile switching centre MSC. At present this solution requires that the user has a separate MSISDN telephone number for data calls, but according to what is currently known the situation will change in such a manner that a separate telephone number for transmitting data will no longer be needed. When a multimedia message is to be sent in circuit-switched and when in data-switched mode can be decided on the basis of the conditions set by the operator or the conditions that can be changed by the user. Furthermore, some embodiments allow an attempt to be made to transfer a multimedia message intended to be transferred as packet-data as circuit-switched data, if the transmission as packet-data is not successful. The transmission mode can also be selected in some embodiments. For example, a small multimedia message including text can be sent as a packet-switched message to the recipient, whereas a large multimedia message including video images and speech can be sent in circuit-switched mode. A multimedia message can also be sent as concatenated short messages.

Figure 7:
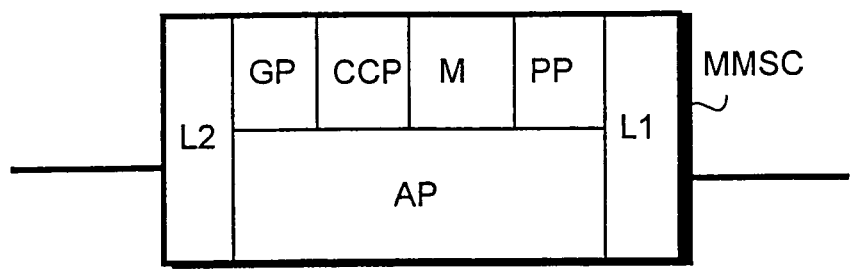
FIG. 7 illustrates a multimedia message service centre of the invention.

FIG. 7 illustrates a multimedia message service centre and the essential operations thereof regarding the invention. FIG. 7 is a block diagram showing a multimedia message service centre MMSC of the invention. The multimedia message service centre MMSC comprises an interface part L1 for receiving and sending short messages to and from the mobile station of the mobile communications system. Depending on the embodiment the interface part L1 transmits the message through an intra-operator backbone network and a serving support node, and through a short message service centre or a backbone network and a gateway support node. The multimedia message service centre MMSC may comprise interface parts L2 (only one shown in the Figure) for connecting a short message service centre to other networks, such as the Internet, another data network and/or a public switched telephone network. These interface parts allow multimedia messages to be sent and received. In addition to these the short message service centre comprises an application part AP transferring the multimedia message received by the multimedia message service centre MMSC to be forwarded as shown, for example, in FIG. 6.

The application part AP identifies the signalling messages shown in FIGS. 2, 3 and 4 and knows how to send and receive messages. The interface parts attend to interpreting lower level protocols. In addition, the application part AP stores a multimedia message, which could not be delivered, into its memory M and retrieves it therefrom, when the multimedia message has successfully been delivered or when the mobile station requests the delivery of the multimedia message. The application part attends to the fact that the multimedia messages or multimedia message segments sent to the mobile station include at least the parts determined in FIGS. 3 and 4. The application part can segment the messages, or divide them into segments, as shown in FIG. 6 in such a manner that the multimedia message size does not exceed the largest size allowed of the messages transmitted in the network and at the air interface. Correspondingly the application part can compose an entire multimedia message from the received segments for further delivery. The application part AP can be arranged not to compose an entire multimedia message of the received segments, if the recipient of the message is another mobile station in the same mobile communications system. However, in such an embodiment the application part AP can calculate the size of the message in segments. The application part AP also attends to the fact that the multimedia messages whose validity period ends are deleted from the memory, for example, by indicating the memory area allocated for the message as a free area. The deleted message can remain in the memory until a new message is written over it. The application part can no longer find out the contents of the deleted message. The application part can be arranged to add a validity period to messages lacking it. The application part AP can also be arranged to check whether the MMS-context is activated and to generate the MMS-context activation request to the mobile station MS.

The application part AP may comprise permanent conditions concerning all multimedia message deliveries allowing the application part to directly filter the messages to be sent from the messages that must be informed. The permanent conditions can be located in the memory M. The application part AP can also be arranged to retrieve from the memory M subscriber-specific conditions concerning the multimedia message deliveries and permanent conditions possibly located therein. The application part AP can also be arranged to inquire about subscriber-specific conditions from the home location register, if they are maintained therein. The application part AP can also be arranged to distinguish values concerning the conditions from the multimedia message and to check whether the conditions are fulfilled. If the conditions are met, the application part is arranged to send the multimedia message directly to the mobile station. Permanent conditions refer to conditions set by the operator, and which are identical for all messages. Subscriber-specific conditions refer to conditions set for each subscriber, and to which a terminal, a subscriber or an operator can provide limiting values. If the embodiment supports subscriber-specific conditions, then the application part AP is arranged to update the conditions. The permanent conditions are preferably updated through the network management system.

The multimedia message size and type can, for example, be used as permanent conditions. If, for example, the multimedia message size exceeds the size determined in the conditions, the multimedia message will not be delivered directly. Even if the multimedia message size is smaller than what is determined in the conditions in the example, but the contents are not the same as determined in the conditions, then the multimedia message is not delivered directly.

Subscriber-specific conditions may include a coding mode supported by the terminal, a content type supported by the terminal, the amount of available memory in the terminal, the priority of the multimedia message etc. In the MMS-context activation the terminal can indicate coding modes and the amount of available memory, in which case the application part AP updates these values to correspond with the values of the corresponding conditions. The subscriber can update the specific conditions thereof, such as the size of the multimedia message to be sent directly, for example by using a WWW interface or a signalling message. The operator may in turn determine a condition for some subscribers, on the basis of which the text message having the largest priority must be sent directly irrespective of the size. The application part is arranged, when checking the last condition, to "skip" the contradicting conditions. The conditions can thus be of different levels. When setting conditions logical operators such as AND, OR, XOR, NOT can also be employed. The invention does not in any way restrict the conditions, or how they are formed or applied, but they can freely be planned by the operator.

In embodiments where alternative delivery routes can be selected for the multimedia message, the application part AP is arranged to select the delivery route based on the given route conditions, and to request for routing instructions for said delivery route. The route condition can, for example, be the following: text messages smaller than size X concatenated as short messages, messages including video images and exceeding size Y in circuit-switched mode, others in packet-switched mode.

In the embodiments employing a separate recipient identifier, like a hash, the application part AP is arranged to calculate or to allocate in another way the recipient identifier and to add it to the message informing about the multimedia message. In these embodiments the application part is arranged to retrieve the multimedia message from the memory on the basis of the recipient identifier.

The multimedia message service centre can also comprise a generating part GP of the message for generating short messages for example in accordance with the instructions provided by the application part. Depending on the embodiments the generating part GP can also transmit a command to the short message service centre to generate a short message. In the embodiments where short messages are not used, the generating part can generate a data message or a small multimedia message informing about a multimedia message waiting for a delivery request.

The multimedia message service centre may also comprise a packaging part PP that checks whether the contents of the multimedia message are already packed. If the contents are not packed, the packaging part PP performs the packaging. Data is thus transferred more efficiently, as the amount to be transferred is reduced. The packaging part preferably checks, for example, through the application part whether packed messages can be sent to the mobile station. The packaging part PP can also unpack the packed contents of the received multimedia message, if packed messages cannot be sent to the mobile station.

The multimedia message service centre may also comprise a coding conversion part CCP. The conversion part releases the message codings and codes messages according to instructions provided by the application part. If, for example, a text is coded by ASCII8 coding, but the mobile station supports ASCII7 coding only, the conversion part converts the ASCII8 coding to ASCII7 coding. The message can thus be delivered to the mobile station in such a manner that the contents thereof remain unchanged and that the message can still be read.

The interfaces located in the interface parts L1, L2 in the multimedia messages service centre are the application interfaces needed in the first preferred embodiment for the data networks such as the IP interface for the Internet or Intranet the interface implemented, for instance, using the protocol shown in FIGS. 3, 4 and 5 for the mobile station MS, the MAP/SS7 interface or the home location register HLR, the GTP/IP interface for the serving support node SGSN and, for example, the CIMD interface for the short message service centre. In addition an interface is needed for the billing gateway centre preferably for billing the sender of sent messages. Possible interfaces also include an interface for the domain name server and an interface for the public switching telephone network. The latter is needed if a multimedia message is loaded as circuit-switched data. An interface is not needed for the serving support node in the second preferred embodiment of the invention, since the multimedia messages are sent through a short message service gateway SMSGW. However, an X.25 interface is at least currently needed for the short message service gateway SMSGW. An interface is not necessarily needed for the home location register nor for the serving support node SSGN in the third preferred embodiment of the invention. The gateway support node GGSB requires an interface preferably an IP interface.

The required interfaces can deviate from the above and are dependent on the protocols supported by the network elements participating in the operation.

Although FIGS. 3, 4, 5, 6 and 7 show that when certain conditions are met a multimedia message is sent directly to the recipient, it is obvious for those skilled in the art that the same result is achieved even if the conditions are set such that their fulfillment will cause indirect transmission.

Figure 8:
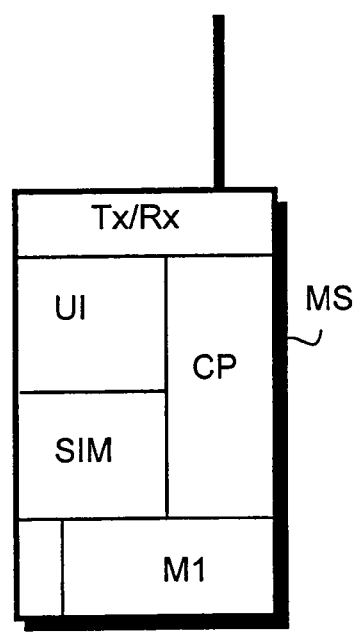
FIG. 8 illustrates a mobile station of the invention.

FIG. 8 illustrates the essential parts of the mobile station and the functionalities thereof regarding the invention. In the GSM system and thus also in the GPRS network the mobile station MS consists of an actual terminal and of a subscriber identity module SIM detachably attached thereto. The subscriber identity module is a smart card placed in the mobile station including, for example, data associated with identifying the subscriber, such as an international mobile subscriber identity IMSI number identifying the mobile station subscriber, and a certain amount of memory for storing the short messages received by the mobile station. The actual terminal comprises a transceiver Tx/Rx including antennas, a user interface UI, a controller CP and a memory M1, from which a certain amount is allocated for storing multimedia messages in the mobile station of the invention.

The user interface UI generally comprises a keyboard, a display, a loudspeaker and a microphone, which are not shown in FIG. 8. By means of the user interface UI the user can compose, send, read, look at and/or listen to, delete and modify multimedia messages and provide the controller CP with other instructions when he/she desires. One instruction is the command to request through the mobile station the delivery of the multimedia message as shown in FIG. 4. The user interface preferably attends to the release of the multimedia message coding. Through the user interface the user is able to provide the subscriber-specific conditions described in greater detail in FIG. 7 with values.

The controller CP obtains from the user interface, for example, impulses associated with the multimedia messages presented above in FIGS. 4 and 5. The controller CP preferably informs the mobile station MS user about a multimedia message that has arrived for the subscriber to the mobile station through the user interface UI, for example, with a sound signal and a message or symbol appearing on the display. The controller may include into the above indication information about the message size and type. The controller CP can also provide the mobile station user with sound signals, text instructions or instruction signals associated with the operation of the mobile station and/or the mobile communications system through the user interface. The controller can also inform an external terminal about the multimedia message and the parameters associated therewith, or it can forward the multimedia message to another external terminal.

The controller receives and sends multimedia messages, short messages and signalling/control messages through the transceiver Tx/Rx. The controller is arranged to send and receive the messages shown above in FIGS. 2, 3, 4 and 5, to add necessary parameters and data therein and to interpret said parameters and data as shown above. What the controller does depends on the embodiments. For example, the controller CP can be arranged to activate the MMS-context always when registering into the GPRS network or merely as a response to the impulse received from the network or the user. When a multimedia message arrives at the transceiver Tx/Rx, the controller can check before receiving the message that memory allocated for multimedia messages is still available. The controller can also check the message type and the coding used therein to ensure transmission of the multimedia message to the user through the user interface. This has the advantage that the controller will not in vain store a message that it cannot transmit to the user in the memory. The user can receive the message after he/she has changed terminals, if the validity period is still valid. After the reception of the multimedia message the controller of the mobile station according to the invention preferably stores the message in the terminal memory M1. If the multimedia message is sent in several segments, the controller composes the segments into one message before storing the message. In some embodiments the controller CP can be arranged to store a multimedia message, which the terminal cannot transmit to the user, into the memory of an identification unit. The controller can also be arranged to ask the user where he/she wishes to store the multimedia message.

The controller can be arranged to distinguish a short message informing about a multimedia message from other short messages and to compose an indication of the data to the user through the user interface. If some other way is used to inform about the multimedia message, then the controller is arranged to transmit the data to the user in accordance with the indication manner employed.

When multimedia messages are sent from the mobile station the controller CP segments the message, if needed, and attaches to the message the necessary parameters which are described in greater detail in FIG. 5.

The controller can be arranged to add conditions, for example information about codings supported by the user interface, data types and available memory to the activation messages of the MMS-context. The controller can be arranged to send information on available memory also to an acknowledgement message which the controller sends after the reception of the last segment of the multimedia message.

However, it is essential for the mobile station that it can identify a multimedia message and is able to interpret and transmit the message to the user by employing the correct means.

It is assumed above that a multimedia message is always received by a mobile station. This is, however, not always the case. For example, in the visiting network area it may be more advantageous to retrieve larger multimedia messages via a fixed network through a local Internet operator. The use of such a fixed network is preferably implemented using embodiments employing a separate recipient identifier, for example a hash.

It should be understood that the above description and the drawings associated therewith are merely intended to illustrate the present invention. The embodiments described above can be combined and the operations therein can be connected to one another. Different variations and modifications of the invention will be obvious for those skilled in the art without deviating from the scope and spirit of the invention set forth in the attached claims.

What is claimed is:

1. A method for delivering messages between a terminal using wireless data transmission in a telecommunications system utilizing wireless data transmission and a second party, the method comprising:
  delivering messages of at least two different content types through a same message service centre, the content types indicating a presentation of the message contents;
  determining at least one first condition at the message service centre, said at least one condition determining at least one of the following: the content type or types of a message to be sent directly, and a maximum size of the message to be sent directly;
  checking from the message to be delivered to the terminal whether it meets the first condition;
  delivering the message directly to the terminal, if it meets the first condition; and
  informing the terminal about the message, if it does not meet the first condition, and delivering the message as a response to a message request concerning the message.

2. The method as claimed in claim 1, wherein
  the message content indicates the presentation of the message contents which can include text, speech, images, video images or combinations thereof.

3. The method as claimed in claim 1, further comprising receiving a value associated with the first condition from a terminal user in the message service centre; and updating said value with a received value.

4. The method as claimed in claim 1, further comprising receiving a terminal property as a value associated with the first condition in the message service centre; and
  updating said value with a received value.

5. The method as claimed in claim 1, further comprising
  adding a recipient identifier to the message to provide information about the message to be sent to the terminal, the identifier enabling identification of the recipient of the message to be received; and
  delivering the message only if the message request includes the recipient identifier associated with the message.

6. The method as claimed in claim 1, further comprising
  delivering messages from the message service centre to the terminal using at least two different delivery routes;
  determining at least a second condition at the message service centre; and
  selecting the delivery route for the message on the basis of the second condition.

7. The method as claimed in claim 1, further comprising
  transferring the message between the terminal and the message service centre in packets of a particular size;
  checking before transferring the message whether it fits into one packet; and
  if so, transferring the message in one packet;
  if the message does not fit into one packet;
    dividing the message into segments so that one segment fits into one packet; and
    transferring the message in consecutive segments.

8. The method as claimed in claim 1, further comprising employing a same protocol for the messages between the terminal and the message service centre.

9. The method as claimed in claim 7, further comprising composing the message of the received segments.

10. A wireless telecommunications system comprising at least one terminal, the terminal being able to receive messages of at least a first content type and a second content type, the content type indicating the presentation of the message contents; and
  a message service centre for transmitting messages of at least the first content type and the second content type between the at least one terminal and a second party, the message service centre delivering said messages to said terminal as messages according to a first protocol, wherein
  the message service centre is arranged to check before delivering the message to the terminal, whether the message meets at least one predetermined first condition, said at least one condition determining at least one of the following: the content type or types of a message to be sent directly, and a maximum size of the message to be sent directly, and in response to a result of the check, to deliver the message directly to the terminal or to inform the terminal about the message and to deliver the message in response to a message request concerning the message; and
  the terminal is arranged to receive an indication about the message, to inform the terminal user about the indication, and to send the message request concerning the message to the message service centre as a response to instructions received from the user.

11. The system as claimed in claim 10, wherein
  the terminal is arranged to inform the message service centre about message content codings that it supports; and
  the message service centre is arranged to check the coding of the message to be delivered to the terminal, to compare it to the codings supported by the terminal, and if the terminal does not support the message coding, to change the message coding to a coding supported by the terminal.

12. The system as claimed in claim 10, wherein
  the system is arranged to transfer the messages in the system between the terminal and the message service centre in packets of a particular size; and
  the message service centre is arranged to check before a message is delivered to the terminal, whether the message fits into one packet, and if the message does not fit into one packet, to divide the message into segments and to deliver the message to the terminal in consecutive segments.

13. The system as claimed in claim 12, wherein
  the message service centre is arranged to pack an unpacked message with a packaging method supported by the terminal before the message service centre checks whether the message fits into one packet.

14. A message service centre connectable to a wireless telecommunications system, the message service centre comprising
  interface means for receiving messages of at least two different content types and for forwarding to a terminal in a telecommunications system, the content types indicating the presentation of the message contents; and
  application means for selecting the manner of delivery of said messages by checking whether the message meets at least one predetermined condition, said at least one predetermined condition determining at least one of the following: the content type or types of a message to be sent directly to the terminal, and a maximum size of the message to be sent directly to the terminal, and in response to a result of the check, to deliver the message directly to the terminal or to inform the terminal about the message and to deliver the message to the terminal as a response to a message request concerning the message.

15. The message service centre as claimed in claim 14, wherein the application means are arranged to deliver said messages addressed to the terminal and to receive the messages received from the terminal using a same protocol.

16. The message service centre as claimed in claim 14, wherein the application means are arranged:
   to check before delivering the message to the terminal, whether the message fits into one packet, and if the message does not fit into one packet, to divide the message into segments and to deliver the message to the terminal in consecutive segments; and
   to receive the message from the terminal in consecutive segments and to deliver the segments to a second terminal of the system without composing a message thereof.

17. The message service centre as claimed in claim 14, wherein the application means are arranged to select a delivery route for each message on the basis of a predetermined condition or predetermined conditions.

18. A mobile station for receiving messages, the mobile station being configured to determine at least one condition determining at least one of the following: the content type or types of a message to be sent directly to the mobile station, and a maximum size of the message to be sent directly to the mobile station, wherein the content type indicates the presentation of the message contents:
   the mobile station comprising:
   a user interface through which the mobile station user can receive messages of at least a first content type and a second content type; and
   a controller for receiving messages of at least the first content type and the second content type using a same protocol, wherein the controller is capable of receiving an indication concerning a message waiting for delivery, transmitting the indication to the user through the user interface, sending a delivery request of said message in response to a user command received through the user interface, a receiving said message as a response to the delivery request, and sending said at least one condition in response to a user command received through the user interface.

19. The mobile station as claimed in claim 18, wherein the controller is further capable of receiving the message in consecutive segments and composing the message of the received segments.

20. The mobile station as claimed in claim 18, wherein the controller is further capable of sending messages of at least the first content type and the second content type, checking before sending the message whether it fits into one packet; and
   if so, sending the message in one packet;
   if the message does not fit into one packet;
      dividing the message into segments so that one segment fits into one packet;
      sending the message in consecutive segments.

* * * * *